(No Model.) 4 Sheets—Sheet 1.

J. C. WALKER.
RESUSCITATING APPARATUS.

No. 587,891. Patented Aug. 10, 1897.

WITNESSES:
J. C. Shaw
J. Edw. Luckett

INVENTOR
James C. Walker,
BY
Fred G. Dieterich & Co.
ATTORNEYS (No Model.) 4 Sheets—Sheet 2.
J. C. WALKER.
RESUSCITATING APPARATUS.
No. 587,891. Patented Aug. 10, 1897.
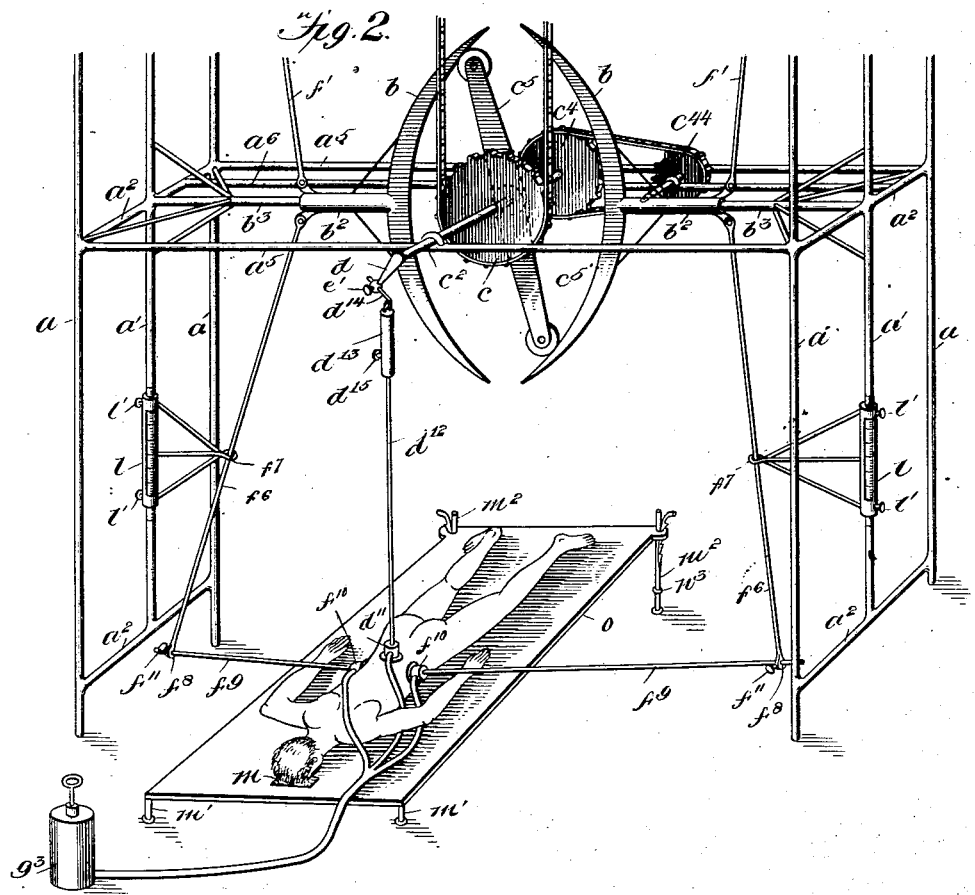
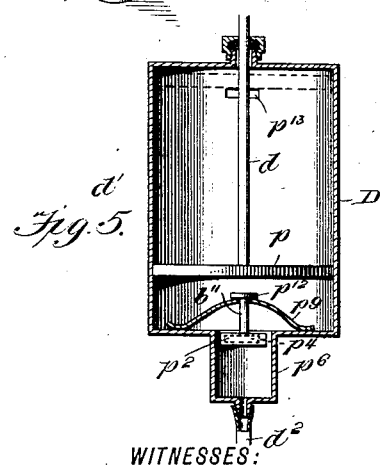
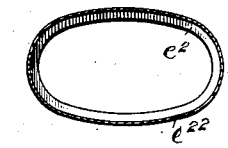
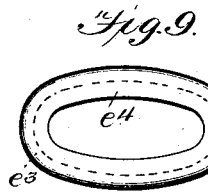
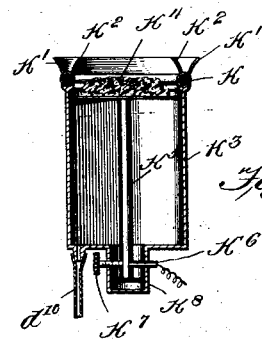
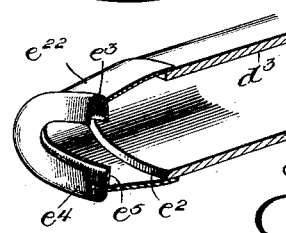
WITNESSES:
J. C. Shaw
J. Edw. Luckett
INVENTOR
James C. Walker,
BY
Fred G. Dieterich & Co.
ATTORNEYS (No Model.)
4 Sheets—Sheet 3.
J. C. WALKER.
RESUSCITATING APPARATUS.
No. 587,891.
Patented Aug. 10, 1897.
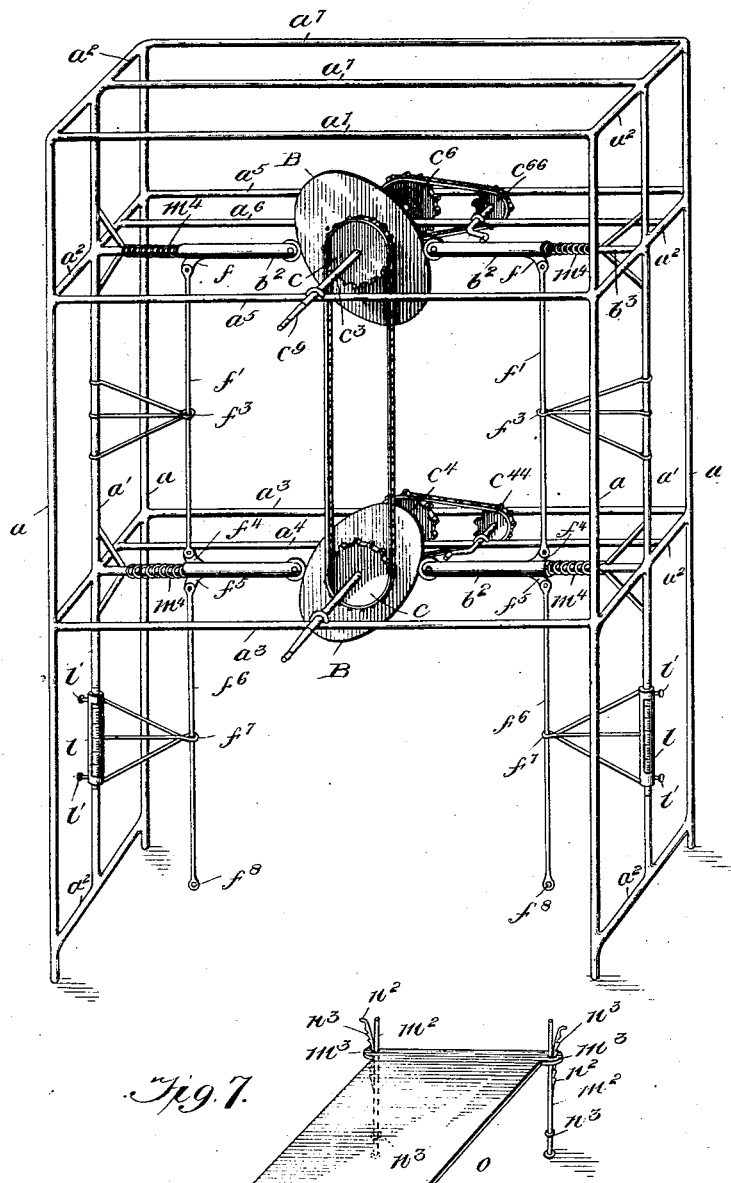
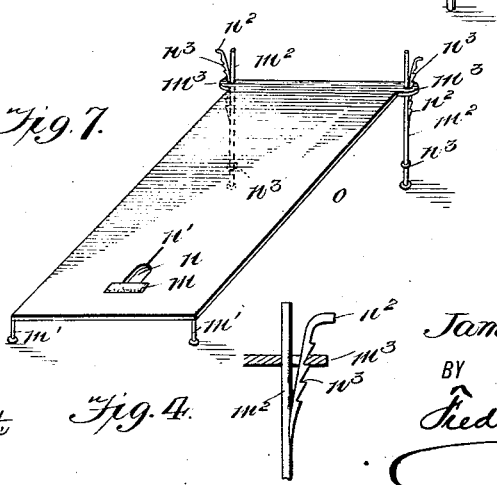
WITNESSES:
J. C. Shaw
J. Edw. Luckett
INVENTOR
James C. Walker,
BY
Fred G. Dieterich
ATTORNEYS (No Model.) 4 Sheets—Sheet 4.

J. C. WALKER.
RESUSCITATING APPARATUS.

No. 587,891. Patented Aug. 10, 1897.

WITNESSES:
J. C. Shaw.
J. Edw. Luckett.

INVENTOR
James C. Walker,
BY
Fred G. Dieterich & Co
ATTORNEYS

UNITED STATES PATENT OFFICE.

JAMES C. WALKER, OF WACO, TEXAS.

RESUSCITATING APPARATUS.

SPECIFICATION forming part of Letters Patent No. 587,891, dated August 10, 1897.

Application filed November 18, 1895. Serial No. 569,331. (No model.)

*To all whom it may concern:*

Be it known that I, JAMES C. WALKER, residing at Waco, in the county of McLennan and State of Texas, have invented a new and Improved Resuscitating Apparatus, of which the following is a specification.

My invention is in the nature of a respirating or resuscitating apparatus; and it has for its object to provide an apparatus of this character which can be quickly attached to the patient, easily manipulated, and which will effectively serve for its intended purposes.

With other objects in view, which will hereinafter appear, my invention consists in an apparatus for the purposes stated, such as will be first described in detail, and then specifically pointed out in the appended claims, reference being had to the accompanying drawings.

Figure 1:
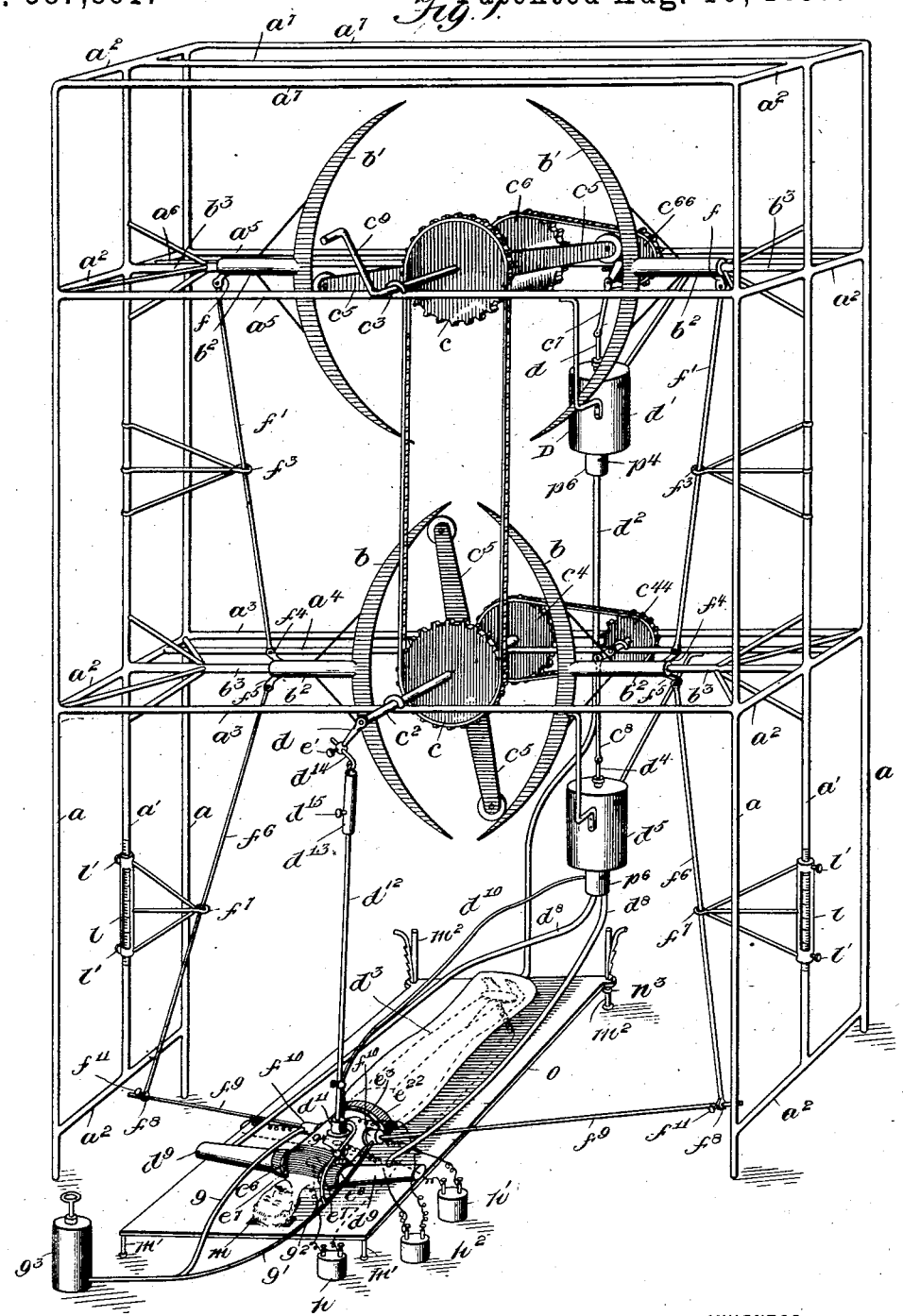
Figure 11:
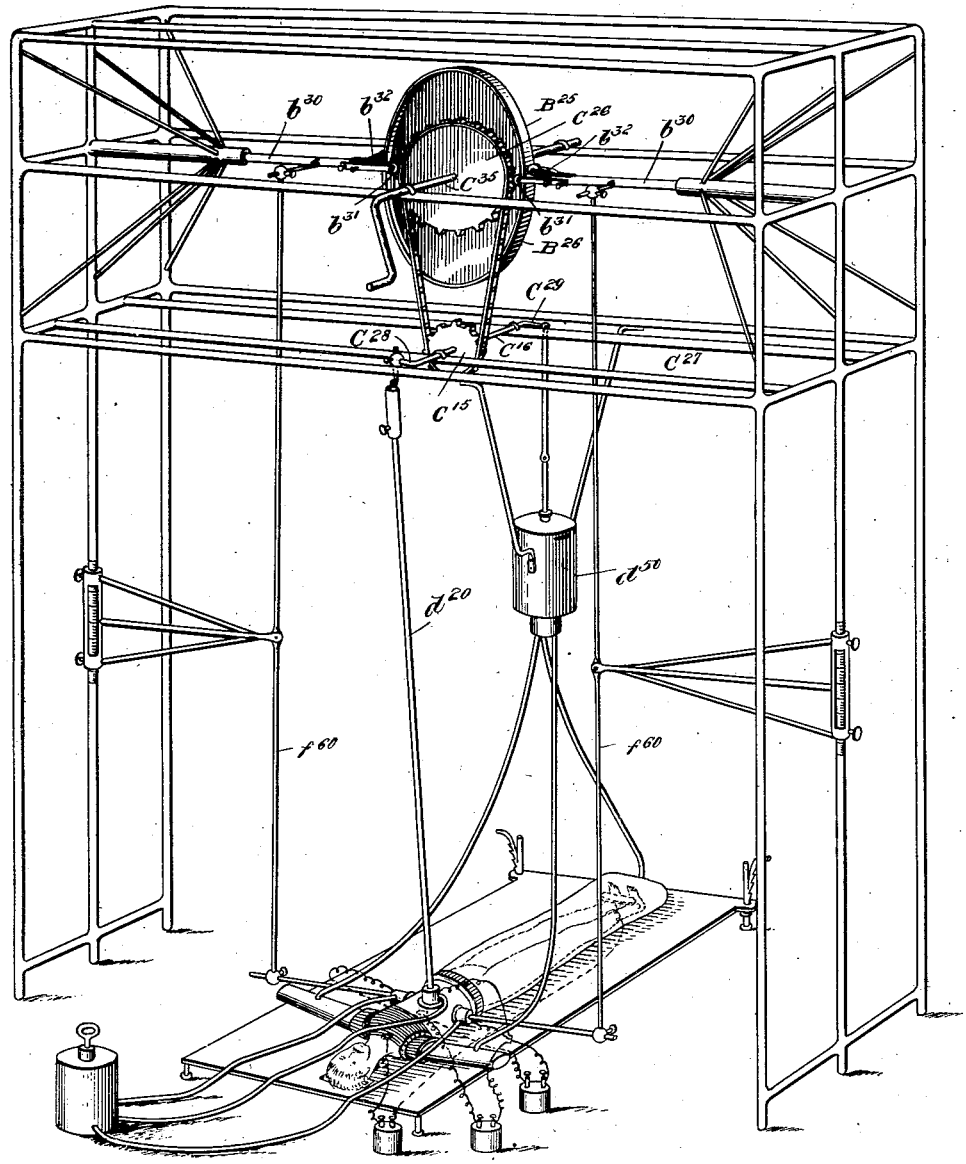
Figure 12:
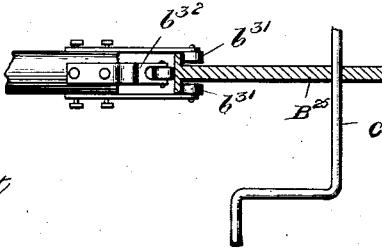

Figure 1 is a perspective view of my respiration apparatus, showing the same as arranged for use. Fig. 2 is a similar view of a portion thereof, showing the first position and first treatment of the patient. Fig. 3 is a view illustrating a modified arrangement of parts, as will hereinafter fully appear. Fig. 4 is a detail view of the adjustable support for the table, hereinafter referred to. Fig. 5 is a sectional view of one of the automatically-operated pumps. Fig. 6 is a vertical section of one of the vacuum-cups. Fig. 7 is a perspective view of the table; and Figs. 8, 9, and 10 are detail views, hereinafter referred to. Fig. 11 is a perspective view illustrating my improved apparatus equipped with a double-acting cam for operating the several pump and air devices, hereinafter referred to; and Fig. 12 is a view of a portion thereof, taken practically on the line 12 12 of Fig. 11.

In the practical construction my resuscitating or respirating apparatus comprises a framework, preferably of six uprights $a\ a'\ a$, nine cross-pieces $a^3$, $a^4$, $a^5$, $a^6$, and $a^7$, and eight end cross-pieces $a^2$, which are formed together, as shown in Fig. 1, and may be either hard wood, metal, or both, as may be best suited for the purpose.

$b\ b$ and $b'\ b'$ are ellipsoidal-shaped steel guides, which have a thin inner edge—say one-eighth of an inch, increasing in thickness to one-half or three-fourths of an inch, as may be required to give strength for the purpose hereinafter stated—such guides being rigidly fixed at their outer edges at the middle of the crescent to four tubes $b^2$, which move back and forth over four metal rods $b^3$, which are rigidly fixed to the upright frame members $a'$ and braced by four braces, two of which are rigidly fixed to the uprights $a'$, while the other two are secured to the frame members $a\ a$. The tubes or sheaths $b^2$ are also held steady by two braces connected to the crescent guides, as shown.

$c\ c$ indicate sprocket-wheels which are fixed on axles journaled in cross-pieces $a^3$, $a^4$, $a^5$, and $a^6$, as shown, and both sprocket-wheels, by a suitable sprocket-chain, are worked by the crank $c^9$ on the upper axle $c^3$. The wheels $c\ c$, being the same size, work synchronously. On the sprocket-wheel axles, back of the wheels, are fixed four arms $c^5$, having small grooved wheels in their outer extremities which engage with the inner edges of the ellipsoidal disks, which guides are half ellipses or ellipsoids. In the lower set of ellipsoids the arm $c^5$ scarce touches the crescent guides, while in the upper set the arms press the disks nearly to the limit of their outward movement. On the back portion of the upper axle is held a sprocket-wheel $c^6$, which is connected by a chain with a sprocket-wheel $c^{66}$ of one-half the diameter of wheel $c^6$, the axle of which is journaled in the cross-pieces $a^5\ a^6$ and has a crank member connected by a rod $c^7$ to a piston-shaft $d$ of an air-pump $d'$, which is held securely braced in position on the cross members $a^3$ and $a^4$, as shown most clearly in Fig. 1.

The pump $d'$, the construction of which is most clearly shown in Fig. 5, comprises a body D, a piston $p$, the shaft $d$ of which connects with the rod $c^7$. At the bottom the body D has a small valve-chamber $p^6$, in which is a slip-valve $p^2$, to which is connected a rod $p'$, which passes into the body D and terminates in a head portion $p^{12}$, which is adapted to bear on an elliptical or other spring or cushion member $p^9$, the ends of which rest on the bottom or base of the pump, for a purpose presently explained. $p^4$ indicates an opening in the side of valve-box $p^6$, over which the slide-valve $p^2$ is held to move, it being of a sufficient size to cover the part $p^4$. From the valve-box $p^6$ of the pump $d'$ extends a rubber tube $d^2$, which leads to a casing or box $d^3$, hereinafter explained.

On the inner end of the axle of the lower sprocket-wheel $c$ and disposed between the cross-pieces $a^4$ and $a^3$ is fixed a sprocket-wheel $c^4$, connected by a chain with sprocket-wheel $c^4$, the axle of which is journaled in the cross-pieces $i^4$ and $a^3$, as shown. The inner end of this axle has a crank connected by rod $c^8$ with the piston-shaft $d^4$ of an air-pump $d^5$, which is fixedly held in position by braces secured to the framing, as shown. The air-pump $d^5$ is of substantially the same construction as pump $d'$, (illustrated in Fig. 5,) and therefore need not be referred to in detail.

From the valve-box of pump $d^5$ leads the rubber tubes $d^8$ $d^8$, which pass to the arm boxes or sheaths $d^9$ $d^9$, made air-tight, in which the arms of the patient are adapted to be held. A third tube $d^{10}$ also connects with the valve-box of pump $d^5$, which joins such box to a vacuum-cup $d^{11}$, which is kept in position by a rod $d^{12}$, which is held to slide in a tube $d^{13}$ and held to its adjusted position by a thumb-screw $d^{15}$, such construction admitting of the rod $d^{12}$ being lengthened or shortened to size of patient.

By referring now to Fig. 1 it will be seen that tube $d^{13}$ has an extension $d^{14}$, which connects with a crank $e$ on the end of axle $c^2$, which is made adjustable, as shown, so that it can be lengthened or shortened to suit the size of the patient. $d^3$ indicates the leg-box, formed of wood or other material and made air-tight and of sufficient capacity to inclose the feet and legs up to the hips. To this leg-box, at the upper edge $e^{22}$, is fixedly secured a rubber-cloth adapted to extend around the body which is joined to a pneumatic tube $e^3$, which also extends around the body in connection with the rubber cloth. This tube has two flanges or flaps of rubber cloth, one internal $e^5$ and one external $e^4$. The circumference of the pneumatic tubes and the perimeters of both flanges are considerably less than the internal circumference of the box $d^3$, as clearly shown in Figs. 8, 9, and 10, in which $e^2$ represents the rim of the box, $e^{22}$ the rubber cloth, and $e^3$ the pneumatic tube.

In Fig. 10 is shown the internal flange or flap, the external flap $e^4$, the pneumatic tube $e^3$. $e^5$ indicates the internal perimeter of the flap.

By reference to Fig. 9 the flap $e^5$ will be seen to extend inwardly from the tube, the inner circumference of which, being contracted in its natural condition, is shown in dotted lines. It will also be observed that the flap $e^4$ is attached to about the middle of the outer body of the tube, the said flap $e^5$ having its outer edge considerably contracted in circumference from that of the tube. The flaps are of rubber cloth and made to contract and fit close to the hips and shoulders of the patient.

The arm-boxes, before referred to, are similarly made of wood or other suitable material from the outer ends to the edges $e^6$ $e^6$, to which (see Fig. 1) are attached rubber-cloth portions which connect with the pneumatic tubes $e^7$ $e^7$ and are of sufficient capacity to inclose the arms and hands. These cases or boxes, as also the leg-box, are made with as little internal spare space as possible and may be of different sizes to suit patients.

The tubes $e^7$ $e^7$ are made to fit as close as possible around the arms in the arm-pits and over a part of the shoulders, they being held in position by elastic lacings underneath the shoulders, as also across the breast, as shown by the dotted lines on the tubes in Fig. 1.

The pneumatic tubes are made with flaps and in similar manner as described above for the leg-box, so that in these, as also in the leg-box, when the air is compressed by the pumps the internal flap will be forced into the crease between the pneumatic tubes and the skin of the patient, and thus prevent the escape of the air from the casing or box. When the air is withdrawn from the casings by the pump, the outer flaps will be drawn into the crease between the said tubes and the skin of the patient, and thus prevent air from going into the casings, whereby a partial vacuum and compression is alternately created in the said casings or boxes.

Referring now again to Fig. 1, it will be observed that the outer ends of tubes $b^2$ $b^2$, upper set, are connected by short links $ff$ with levers $f'$ $f'$, which extend through apertures in the ends of the studs $f^3$ $f^3$ (fixed to the main framing, as shown) down to the tubes below $b^2$ and linked thereto, as at $f^4 f^4$. With the last-named tubes $b^2$ are also connected levers $f^6$ $f^6$, joined thereto by short links $f^5$ $f^5$. These levers $f^6$ $f^6$ pass down through apertured studs $f^7$ $f^7$ and have at their lower extremities holes $f^8$ $f^8$, through which the levers $f^9$ $f^9$ pass, and when properly adjusted are fixed by the thumb-screws $f^{11}$ $f^{11}$. The inner extremities of the levers $f^9$ $f^9$ are fixed to the vacuum-cups $f^{10}$ $f^{10}$, adapted to be pressed against the sides of the patient, as shown in Fig. 1, which cups are connected by rubber tubes $g$ $g'$ with the air-pump $g^3$.

$d^{11}$ indicates a supplemental or breast cup, which also connects with the pump $g^3$ by a branch tube $g^2$, running out from $g'$, this latter connection being regulated by valve $g^4$.

The several vacuum-cups are constructed in the manner clearly shown in Fig. 6 and comprise a body portion $k^3$, made of glass or other suitable material, having one end open, which end is adapted to be applied to the body of the patient. The rim of the cup is fixed in or to a pneumatic tube $k$, from which extends internal flaps $k^2$ $k^2$ and external flaps $k'$ $k'$, Fig. 6. Close to the open end of the vacuum-cup is a sponge-electrode $k^4$, of one-third less area than the opening in end of cup, which is fixed on a copper base fitted on a copper rod $k^5$, which extends through the top of the cup and enters a tube $k^8$, and when in proper position is fixedly held by the thumb-screw $k^7$. The electrodes $k^4$ are connected with the battery by means of the insulated stud $k^6$, which enters the tube $k^8$ through a slot and which is adapted to receive the battery-wire, the rod $k^5$ being also well insulated. The object in so providing a vacuum-cup, as shown, is for the double purpose of conducting electricity into the body of the patient and to prevent a very great bulging of the skin and flesh into the cup during the vacuum in the said cup, while at the same time the pressure of the vacuum remains unchanged.

In Fig. 6 is shown the breast-cup $d^{11}$, similar to cup $f^{10}$, connected for ordinary use by rubber tube $d^{10}$ with the valve-box $p^6$ of the lower air-pump $d^5$. This cup $d^{11}$ is held in position and connected to rod $d^{12}$, which slides in a tube $d^{13}$, (see Fig. 1,) and when properly adjusted is held fixed by a thumb-screw $d^{15}$, and tube $d^{13}$ being connected by rod $d^{14}$ with the small crank $e$, which passes through an aperture in the end of axle $c^2$, and held fixed by screw $e'$, whereby the stroke of the crank may be lengthened or shortened, accordingly as may be required by the size of the patient.

$h$, $h'$, and $h^2$ are Foradic batteries. One pole of battery $h$ is connected with an electrode at the base of the neck of the patient and the other pole to an electrode placed at the lower end of the spinal column or with the feet of the patient. One pole of battery $h'$ is connected by a wire with a sponge-electrode in cup $f^{10}$ on one side. The other pole is connected to the electrode in the cup $f^{10}$ on the other side of the patient. One pole of battery $h^2$ is connected to electrode in cup $d^{11}$, and the other with an electrode under the body, as will hereinafter be more fully explained.

$f^7 f^7$ indicate studs which are fixed to sheaths $l l$, (see Fig. 2,) which are held to slide on uprights $a'$ and having each an aperture in front showing a scale of inches on the uprights, and when properly adjusted are fixedly held by the thumb-screws $l' l'$, such studs being braced, as shown, to the sheaths. The object of this last-described construction is to increase or lessen the movement of the lower extremities of the levers $f^6 f^6$, accordingly as may be required to suit the size and expansion of the chest of the patient. When the studs are disposed at the middle of the levers, (the upper studs $f^3 f^3$ being permanently fixed at the middle of the levers $f' f'$,) it is evident that so much movement of the upper end of levers caused by the ellipsoidal disks will cause a like movement of the lower ends of the levers. Such movement of the said ends of the lower levers $f^6 f^6$ is dependent on whether the studs $f^7 f^7$ are placed at the middle, above, or below the middle of the levers $f^6$. If at the middle, the movement of the lower extremities will be the same as the upper extremities; if above the middle the movement of the lower extremities is greater than the upper, and if below the middle the movement of the lower extremities is less than the upper extremities. Hence it is evident the movement of the lower extremities of the levers $f^6 f^6$ can be easily adjusted to the patient.

$g^3$ represents an exhaust air-pump worked by hand separately from the apparatus and which is also connected with the vacuum-cups $d^{11}$ and $f^{10}$ by rubber tubes $g$, $g'$, and $g^2$, the object of which is to keep a continuous vacuum in the cups, except as may be varied in cup $d^{11}$, which is adapted to be cut off from the pump $g^3$ by the valve $g^4$. (See Fig. 1.) Cup $d^{11}$ is also connected by tube $d^{10}$ with pump $d^5$, the object of this connection being to make the vacuum and compression in cup $d^{11}$ synchronous with cups $f^{10} f^{10}$, if found advantageous.

In Fig. 3 is shown a modification of the mechanism shown in Fig. 1. In this latter construction instead of using the ellipsoid disks $b b'$ ellipsoidal cams B B are provided, and instead of the tubes $b^2$ being fixed to the disks, as shown in Fig. 1, small grooved wheels are fixed at their inner ends, which play against the cams, and thus by the movement of the cams the tubes $b^2$ are moved back and forth, as before described.

Spiral springs $m^4$ are provided to keep the tube and wheels in contact with the cams and also to relieve the levers $f' f'$ from the strain of this movement.

In Fig. 2 the drowned patient is shown on the table $o$ (the construction of which is most clearly shown in Fig. 7) with his back uppermost, his forehead resting on the low cushion $m$ and his face protruding in the opening $n$, his chin resting on the edge of the opening $n'$, which will serve to keep his mouth and throat open, and with the cups $d^{11}$ and $f^{10}$ placed against the body, as shown, the table being considerably elevated at the foot end. At this time none of the cups are connected with the pumps $d'$ and $d^5$, but a vacuum is produced in all by the pump $g^3$. At this time the cups $f^{10} f^{10}$ are moved laterally by the levers $f^6 f^6$ and alternately press in and pull out the sides of the patient, while the cup $d^{11}$ moves slightly and synchronously with cups $f^{10} f^{10}$—i. e., when these cups $f^{10}$ pull the sides out the cup $d^{11}$, through the medium of the lever $d^{12}$ and crank $e$, pulls the back up, and when the sides of the patient are pressed in the cup $d^{11}$ presses downward, so that this movement will expel all the water out of the lungs and stomach of the patient. When this is accomplished, the cups are loosened and the patient turned over on his back, as shown in Fig. 1. His arms and legs are then quickly placed in the arm and leg boxes or sheaths above described and the same connected with the pumps $d'$ and $d^5$ by the tubes $d^2$, $d^8$, and $d^{10}$, after which the cups $f^{10} f^{10}$ are replaced on the sides and the cup $d^{11}$ on the chest of the patient. The table is then let down to a level with the stop-knobs $n^3 n^3$, the air is exhausted from the cups, and the ellipsoid guides connected with the arms $c^5$, so that such arms (or the long axis of the cams) will continue to work at right angles, and thereby when the upper ellipsoid guides are widest apart the lower ellipsoidal guides will be to their closest or drawn-in position, as clearly shown in Fig. 1, it being manifest that practically the same operation is effected by using the cam devices B B and the adjusting parts connected therewith instead of the ellipsoidal-guide construction.

It should be stated that in practice the pumps $d'$ and $d^5$ are so arranged that they will respectively begin and end their stroke at the same instant by a proper adjustment of their cranks, so that the piston of the pump $d'$ will begin to descend as the small wheels in the arms $c^5$ come in contact with the upper horn of the ellipsoid guides, (the right arm $c^5$ in upper guide comes in contact with the upper horn of the right disk, while the left arm $c^5$ comes in contact with the lower horn of the left guide,) such piston continuing to descend until the arms in the upper guides reach the center of the disks exactly opposite to the tubes $b^2 b^2$. As the arms reach these horizontal points the aforesaid piston will begin to rise and will complete its movement as the arms pass from touch of the upper crescent disk.

By following the arrangement of the several parts as described on Fig. 1 of the drawings it will be apparent that the expansion of the upper guides through the several levers and cups expands the chest, while the expansion of the lower guides forces the upper end of the levers $f^6 f^6$ outwardly, and thereby causes the lower extremities to move inwardly, thus compressing the chest—natural breathing. The pumps $d'$ and $d^5$ acting synchronously with the guides when the chest is expanded compression of air is produced in the leg and arm boxes, thus causing the blood to flow therefrom to the trunk of the patient, and when contraction of the chest takes place the said pumps $d'$ and $d^5$ cause a partial vacuum in the leg or arm boxes, and thereby draw the blood from the trunk into the extremities, and again when expansion of the chest takes place compression of air in the leg and arm boxes occurs and again forces the blood into the trunk, thereby tending to produce natural circulation, the electric devices used in connection with the circulating devices described naturally aiding to produce a successful result of the operations stated.

Referring now again to the pump devices $d'$ or $d^5$, it should be stated that when the piston is up the spring $p^9$, by means of the head $p^{12}$ on the small rod $p^{11}$, pushes it up. This draws the valve $p^2$ over the opening $p^4$ and shuts out the passage of air through the said opening $p^4$, so that when the piston starts down the air in the pump is forced through the rubber tubes into the leg and arm boxes, and thereby produces the compression of air therein, before mentioned, until the piston reaches the head $p^{12}$ of the rod $p^{11}$, which is then forced down and the opening $p^4$ uncovered, thereby permitting the compressed air in the arm and leg boxes to return and escape to outer air. When the piston starts up, the rod $p^{11}$ is also forced up by the spring $p^9$ and draw-valves $p^5$ over the opening $p^4$. The piston then draws the air through the rubber tubes out of the boxes and produces a partial vacuum, as stated, until the piston passes the opening $p^{13}$. The air then rushes through this and the tubes and produces an equilibrium in the arm and leg boxes, thus producing alternately as the ellipsoid disks are moved compression and rarefication of air in the leg and arm boxes. The movement of the pump-pistons is caused by the rods $c^8$, and which are linked to the cranks on the inner ends of the axles of the small sprocket-wheels $c^{44}$ and $c^{66}$, which are half the size of the main wheels $c^4$ and $c^6$, as before stated, and are so geared that half the revolution of $c^4$ and $c^6$ will produce a complete revolution of the small wheels to cause the reciprocal thrusts of the pistons.

It will manifestly appear by referring to Fig. 1 that as the revolutions of wheels $c$ and $c$ correspond and synchronize with the revolutions of crank $c^9$ the lower disks by means of the wheels $c$ and $c$ are made to synchronize with the upper disk, though set at right angles with such upper disks, so that when the upper disks begin to expand the lower ones begin to contract in the manner heretofore described.

The table for the patient, the construction of which is most clearly shown in Fig. 7, has permanent legs $m' m'$ and adjustable legs $m^2 m^2$, which are longer than legs $m'$ and which pass through the lugs or ears $m^3 m^3$, secured to the table. Attached to the legs $m^2$ are spring-ratchets $n^2 n^2$, which pass through the lugs or ears $m^3 m^3$, by means of which the foot end of the table may be raised to any desired height and so held by the ratchets. $n^3 n^3$ are knobs on which the table may rest to make such table on same level as legs $m'$. $m$ indicates a low movable cushion over which the forehead of patient is adapted to rest. $n$ indicates an opening or slit cut in the table of sufficient size to admit the face of patient, with his chin resting on the edge of said opening $n'$. This will open his mouth for escape of water, the incline of table also placing the throat and chest in the best position for the escape of the water.

In Fig. 11 I have illustrated a simplified construction of my apparatus. In this construction but a single cam member $B^{25}$ is used, which is of elliptical shape and provided with a flanged peripheral member $B^{26}$. Such can be made fast to the crank-shaft $c^{35}$, which shaft has a main sprocket-wheel $c^{26}$ which is geared with a smaller sprocket-wheel $c^{15}$ on a shaft $c^{16}$, held below the shaft $c^{35}$, journaled on a supplemental frame-section $c^{27}$, which shaft $c^{16}$ has connected alternately-projected crank members $c^{28}$ and $c^{29}$, one of which, $c^{28}$, connects with the breast-cup-operating rod $d^{20}$, while the other, $c^{29}$, connects with the piston-rod of the pump $d^{50}$, which in the present construction supplies and exhausts air from the leg and arm boxes, as clearly shown in the drawings. The side cups are operated by the oscillating rods $f^{60}$, which have their upper ends connected to the reciprocating plunger-rods $b^{50}$, to the ends of each of which are secured a pair of roller-guides $b^{31}$ $b^{31}$, which project and fit inside of the cam-flange and a single roller-guide $b^{32}$, which bears on the periphery of such flange, as clearly shown in Fig. 12. By this construction it is manifest that the plunger $b^{30}$ $b^{30}$ will be moved uniformly outward as the shaft $c^{35}$ is revolved, and such operation will serve to act upon the pump and the cup-operating devices in a manner clearly understood by reference to the drawings.

From the foregoing description, taken in connection with the accompanying drawings, it is thought the complete operation and the advantages of my invention will be readily apparent, it being understood that many changes in the details of construction may be made without departing from my invention and the scope of the appended claims.

Having thus described my invention, what I claim, and desire to secure by Letters Patent, is—

1. In an apparatus for the purposes stated, a supporting-table having fixed supports at one end and adjustable supports at the other end, and having an opening near the fixed supported end to receive the mouth and nose of the patient, kneading devices to engage the sides and back of the body, said devices having means for drawing the sides or back outward as they are pulled outward, and a single operating mechanism for the sides and back kneading devices, arranged to operate the said side and the back kneading devices, alternately in opposite directions as specified.

2. In a resuscitating device, the combination with the main frame, the kneading devices for applying pressure to the sides, said devices having rods $f^9$, of the pivotal rods $f^6$ and means for oscillating such rods $f^6$ substantially as shown and described.

3. The combination of the kneading-cups $f^{10}$, having rods $f^9$, the main frame, the adjustable bearing $l$, the rods $f^6$ and means for oscillating such rods as specified.

4. The combination with the main frame, the cups $f^{10}$ $f^{10}$ having rods $f^9$ and the cup $d^{11}$ having rod $d^{12}$, an operating-shaft having cam mechanism, pivoted rods $f^6$ connecting such mechanism with the rods $f^9$, said shaft having a crank member connected with the rod $d^{12}$ as specified.

5. The combination with the main frame, the kneading-cups and levers, the arm and leg boxes and the pumps connected therewith, of a drive-shaft, the sprockets and chains and the sliding devices and levers connected therewith, crank members operated by the sprockets connected with the pumps, the sliding devices and levers being connected with the kneading-cups and levers and a rotating means on the drive-shafts for spreading and contracting the slide devices all being arranged substantially as shown and for the purposes described.

6. The combination with the kneading-cups and levers for operating the same, the airtight leg and arm boxes or casings, and the pumps for producing alternate compression and exhaustion of air therein, of the operating-shafts, the ellipsoidal slide-guides, the revolving arms carried by the shafts, the arms of one shaft operating alternately to the other, the sprocket-and-chain connections joining such shafts, a crank-shaft connected to each pump and geared with the operating-shafts and oscillating lever-arms connected at one end to the slide-guides and at the other to the kneading-cup levers as set forth.

7. In an apparatus for the purposes stated, the leg-boxes having flexible extensions $e^{22}$, pneumatic tubes $e^3$ attached to the ends thereof and the internal and external flexible flaps $e^4$ $e^5$ secured to such tube $e^3$ all being arranged substantially as shown and for the purposes described.

JAMES C. WALKER.

Witnesses:
WALTER V. FORT,
GEO. W. HENDRICK.